United States Patent
Yastrebenetsky et al.

(10) Patent No.: US 10,057,245 B2
(45) Date of Patent: Aug. 21, 2018

(54) USING TEMPORARY CREDENTIALS IN GUEST MODE

(71) Applicant: Google LLC, Mountain View, CA (US)

(72) Inventors: Peter Yastrebenetsky, Santa Clara, CA (US); Vishnu Sivaji, San Jose, CA (US); Patrick Chilton, London (GB)

(73) Assignee: Google LLC, Mountain View, CA (US)

( * ) Notice: Subject to any disclaimer, the term of this patent is extended or adjusted under 35 U.S.C. 154(b) by 230 days.

(21) Appl. No.: 14/799,873

(22) Filed: Jul. 15, 2015

(65) Prior Publication Data
US 2017/0019394 A1    Jan. 19, 2017

(51) Int. Cl.
| | |
|---|---|
| *H04L 29/08* | (2006.01) |
| *H04L 29/06* | (2006.01) |
| *H04N 21/258* | (2011.01) |
| *H04N 21/436* | (2011.01) |
| *H04N 21/4627* | (2011.01) |

(52) U.S. Cl.
CPC ........ *H04L 63/083* (2013.01); *H04L 63/0236* (2013.01); *H04N 21/25816* (2013.01); *H04N 21/25875* (2013.01); *H04N 21/43615* (2013.01); *H04N 21/4627* (2013.01)

(58) Field of Classification Search
CPC ............. G06F 21/6272; G06F 21/6218; G06F 21/6209; G06F 21/606; G06F 21/10; G11B 20/00188; G11B 20/00604
See application file for complete search history.

(56) References Cited

U.S. PATENT DOCUMENTS

| | | |
|---|---|---|
| 8,813,138 B2 | 8/2014 | Warrick et al. |
| 8,819,841 B2 | 8/2014 | Parks et al. |
| 8,826,373 B2 | 9/2014 | Jannelli et al. |

(Continued)

FOREIGN PATENT DOCUMENTS

| | | |
|---|---|---|
| EP | 2328092 A2 | 6/2011 |
| WO | 2014004206 A2 | 1/2014 |
| WO | 2014143171 A1 | 9/2014 |

OTHER PUBLICATIONS

DIAL (Discovery and Launch protocol specification, Version 1.7.2, pp. 1-30, Copyright 2015 Netflix, Inc.

(Continued)

*Primary Examiner* — Benjamin E Lanier
*Assistant Examiner* — Paul Callahan
(74) *Attorney, Agent, or Firm* — Shumaker & Sieffert, P.A.

(57) ABSTRACT

A method may receive, over a network and at a host's media player that is logged in to a host's media account, a play request from a guest's device. The play request may include a request to play a guest's media item from the guest's media account and may be compliant with a first protocol. In response to receiving the play request, the method may initiate a guest mode on the host's media player, log out the host's media account, and securely store the host's credentials. The method may log in the guest's media account with fewer permissions than the host's permissions. The method may play the guest's media item and establish a connection between the host's media player and the guest's device in accordance with a second protocol. Upon completion of playback, the method may log out the guest's media account and log in the host's media account.

20 Claims, 12 Drawing Sheets

(56) References Cited

U.S. PATENT DOCUMENTS

| | | | |
|---|---|---|---|
| 2003/0126211 A1* | 7/2003 | Anttila | H04L 29/06 709/205 |
| 2005/0198693 A1 | 9/2005 | Choi et al. | |
| 2006/0117379 A1 | 6/2006 | Bennett et al. | |
| 2011/0298596 A1 | 12/2011 | Warrick | |
| 2012/0294445 A1* | 11/2012 | Radutskiy | H04L 9/083 380/278 |
| 2012/0322384 A1 | 12/2012 | Zerr et al. | |
| 2012/0324076 A1 | 12/2012 | Zerr et al. | |
| 2013/0055324 A1 | 2/2013 | Ostlund | |
| 2013/0125233 A1* | 5/2013 | Bush | G05B 23/0216 726/19 |
| 2013/0244772 A1* | 9/2013 | Weber | G06F 12/1458 463/29 |
| 2014/0020071 A1 | 1/2014 | Jann Elli et al. | |
| 2014/0366102 A1 | 12/2014 | Parks et al. | |
| 2015/0105046 A1* | 4/2015 | Grosby | H04W 12/06 455/411 |
| 2016/0149891 A1* | 5/2016 | Kuper | H04L 63/083 726/9 |
| 2016/0212103 A1* | 7/2016 | Rhoads | H04W 4/008 |

OTHER PUBLICATIONS

Roku DIAL Programming, Version 1.0, RoKu SDK, pp. 1-7, Feb. 2014.
Use an Xbox One Console as a Guest, Online Article, pp. 1-2, Microsoft 2015.
U.S. Appl. No. 61/664,676, filed Jun. 26, 2012.
International Search Report and Written Opinion dated Oct. 18, 2016 as received in Application No. PCT/US2016/042239.
International Preliminary Report on Patentability from International Application No. PCT/US2016/042239, dated Jan. 16, 2018, 7 pp.
U.S. Appl. No. 15/994,234, by Yastrebenetsky et al., filed May 31, 2018.
Office Action from U.S. Appl. No. 15/994,234, filed Jul. 13, 2018, 7 pp.

* cited by examiner

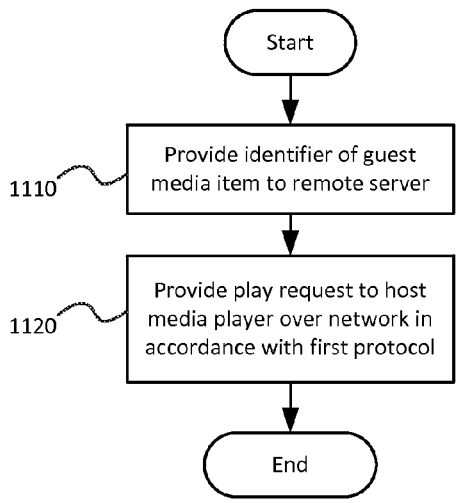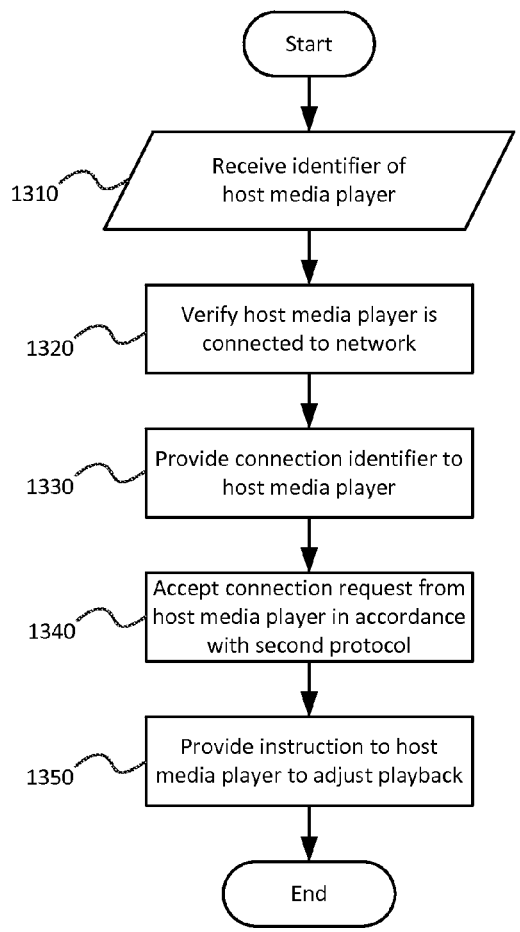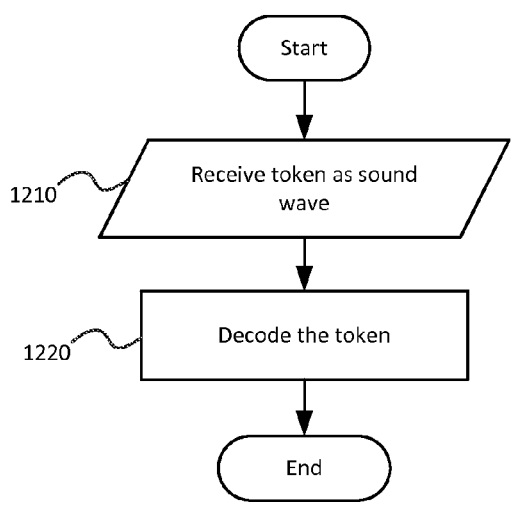
FIG. 11
FIG. 12
FIG. 13

USING TEMPORARY CREDENTIALS IN GUEST MODE

BACKGROUND

Online media services allow users to access their media on a wide range of devices, including devices owned by other people. For example, when a friend is hosting a guest, the guest may use the host's home media player to access and play music over the internet from the guest's online media account. In many circumstances a guest will remain logged in to the host's media player after accessing a particular song because the guest and friend do not want to go through the log in process again in order to have access to additional music, or because the host's media account does not contain the same type of music. This can result in the guest forgetting she was logged in or getting distracted and not paying attention to other people who may be accessing the media player. Once the guest logs in to the host's media player, any person with access to the media player may access aspects of the guest's media account unless the guest logs out. For example, the guest's purchasing account may be accessed to purchase additional media without the guest's consent, or the guest's credentials may be used to view the guest's confidential data or gain access to other online accounts belonging to the guest. Thus, conventional techniques for allowing users access to their online media content often place users at risk for significant financial, privacy, and data security concerns.

BRIEF SUMMARY

According to an embodiment of the disclosed subject matter, a method may receive, at a host media player that is logged in to a host media account with host permissions, a play request from a guest device that is logged in to a guest media account. The play request may include a request to play a guest media item from the guest media account. The play request may be compliant with a first protocol. In response to receiving the play request compliant with the first protocol, the method may initiate a guest mode on the host media player, log out the host media account from the host media player, and store a host credential of the host media account. The method may log in, based on a guest credential, the guest media account to the host media player with guest permissions that include fewer permissions than the host permissions. The method may play the guest media item from the guest media account.

According to another embodiment of the disclosed subject matter, a method may include detecting in accordance with a first protocol and by a guest media device that is logged in to a guest media account, a host media player that is logged in to a host media account. The method may provide to the host media player, a request compliant with the first protocol to play a guest media item from the guest media account. The method may receive a token from the host media player and provide the token to a remote server. The method may receive over a connection in accordance with a second protocol that is different than the first protocol, an indicator that the guest media item is playing on the host media player.

According to another embodiment of the disclosed subject matter, a method may receive, at a server and from a remote host media player that is logged in to a host media account, a first identifier of a host media player and an authorization code. The method may provide a token to the remote host media player in response to receiving the first identifier and the authorization code. The method may receive the token from a remote guest device that is logged in to a guest media account and provide a guest credential of the guest media account to the remote host media player in response to receiving the token. The guest credential may allow read-only access to a guest media item from the guest media account.

According to another embodiment of the disclosed subject matter, a means is disclosed that may receive, at a host media player that is logged in to a host media account with host permissions, a play request from a guest device that is logged in to a guest media account. The play request may include a request to play a guest media item from the guest media account. The play request may be compliant with a first protocol. In response to receiving the play request compliant with the first protocol, the means may initiate a guest mode on the host media player, log out the host media account from the host media player, and store a host credential of the host media account. The means may log in, based on a guest credential, the guest media account to the host media player with guest permissions that include fewer permissions than the host permissions. The means may play the guest media item from the guest media account.

Additional features, advantages, and embodiments of the disclosed subject matter may be apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide further understanding of the disclosed subject matter, are incorporated in and constitute a part of this specification. The drawings also illustrate embodiments of the disclosed subject matter, and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 11 shows a method according to an embodiment of the disclosed subject matter.

FIG. 12 shows a method according to an embodiment of the disclosed subject matter.

FIG. 13 shows a method according to an embodiment of the disclosed subject matter.

DETAILED DESCRIPTION

To address the issues previously discussed, techniques as described herein may play media items from a guest's media account on a host's media player, while limiting access to the guest media account. For example, a guest's device, such as a smart phone, and a host media player, such as a home streaming movie device, may each adopt a first protocol, such as the discovery and launch protocol (DIAL). The guest device may discover the host media player over a home network, such as a wireless local area network (WLAN), by sending a request having a first value specified by the protocol. The host media player may then enter a "guest mode" based on this request and respond with a second value specified by the protocol that identifies the host media player.

Upon discovery of the host media player, the guest device may submit a play request for a media item accessible via the guest media account. For example the guest may be logged in to their media account through an app on their smart phone. The guest may request that their media account stream a movie to the host media player from the online media library associated with their guest media account.

The guest may be required to log in to an app on the host media player in order for the host media player to be authorized to display the movie. In order to log in to the host media player, the host media player may request a token over the internet from a remote server associated with the guest media account. The remote server may be, for example, a digital media distribution platform and online marketplace that maintains media accounts for users. The guest media account and the host media account may each be maintained by the remote server. The remote server may provide the token to the host media player and the host media player may provide the token to the guest device. For example, the token may be an audio file, and the host media player may play the audio file. The guest device may capture the audio signal and decode the signal into the token. The guest device may then submit the token over the internet to the remote server for validation. The remote server may then validate the token and provide log in credentials of the guest media account over the internet to the host media player. The log in credentials may only carry "read-only" permissions for the requested movie.

The host media player, having entered guest mode, may log out the host media account from the host media player and store the host's credentials securely on the host media player. The host media player may receive the guest credentials and log in the guest media account based on the guest credentials. Guest mode may implement conditions that only allow the host media player to receive read-only permissions and only play the requested movie from the guest media account. The host media player may then play the requested movie from the guest media account.

Figure 1:
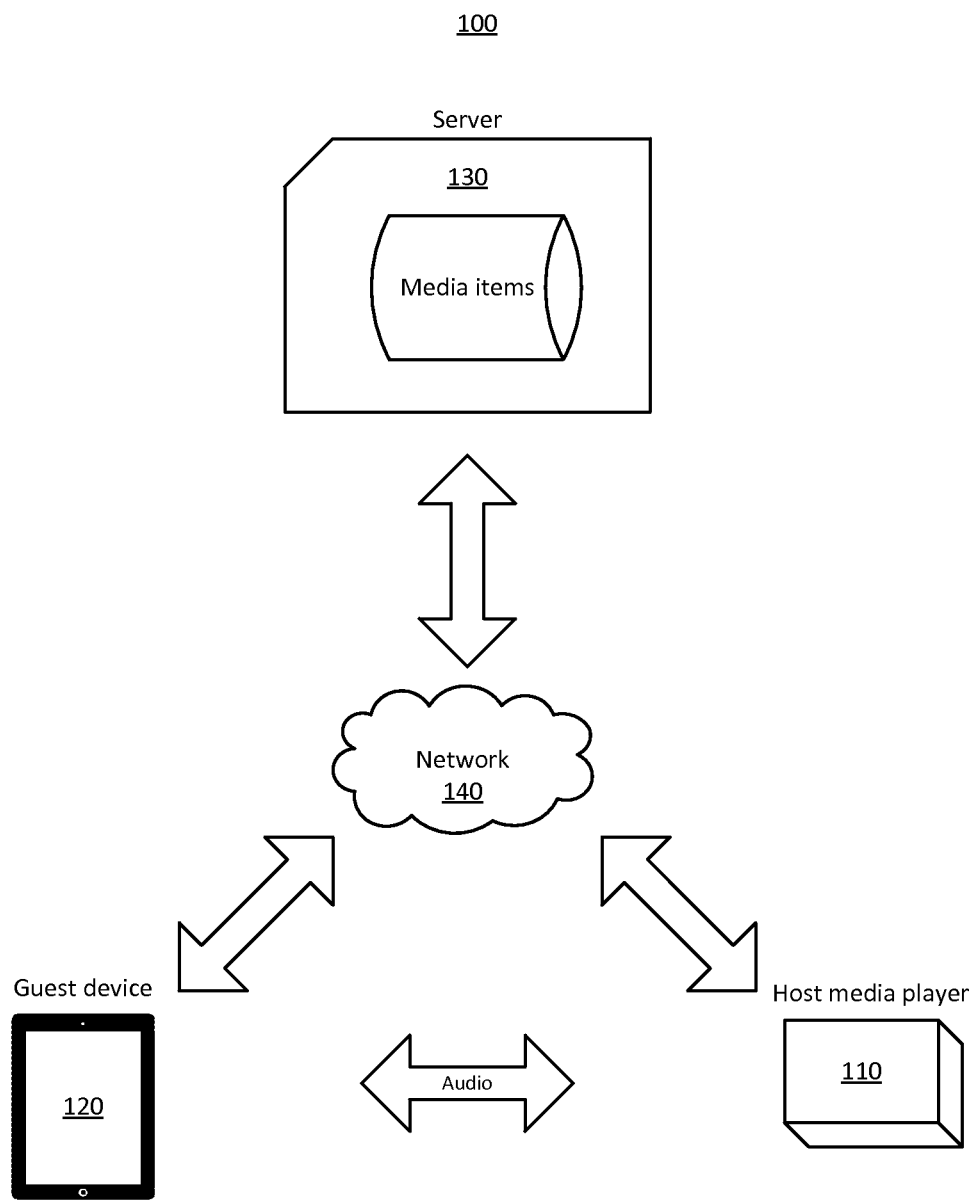
FIG. 1 shows a system relationship according to an embodiment of the disclosed subject matter.

The methods and systems set forth in this disclosure may be embodied in system components having various relationships. For example, FIG. 1 shows a system relationship according to an embodiment of the disclosed subject matter. Host media player 110 may connect to guest device 120 and server 130 over network 140. The host media player may be any device suitable for playing media. For example, the host media player may be a streaming media player that communicates with other devices over the network, receives media content over the internet, executes apps that access content from media accounts, and plays content through a home display device, such as a television or projector. In addition, the host media player may be any of a home computer, laptop, tablet, smart phone, smart display, or similar device that is suitable to perform the functions of this disclosure. The guest device may be a smart phone, tablet, laptop, or similar device that communicates with devices over the network, executes apps that access content from media accounts, or otherwise is suitable to perform the functions of this disclosure.

In some implementations, the host media player and guest device may not be in direct communication with one another. In other implementations, the host media player and guest device may be in direct communication, or may initially not be in direct communication and then transition into a direct communication connection. The host media player and guest device may communicate over a WLAN, over a broader network such as the internet and/or network 140, through audio or light signals, over other network techniques such as the Bluetooth standard, or in any other manner suitable to perform the functions of this disclosure.

The server may be remote from or co-located with the host media player and/or guest device, and may include a single computing device or multiple networked computing devices. The server may be for example a digital media distribution platform that distributes streaming media such as movies, television, video clips, images, music, and other audio. The server may also be an online marketplace that maintains media accounts for users, such as by managing authentication and access to user accounts, maintaining financial data of users, executing transactions, and otherwise operating in a manner suitable to perform the functions of this disclosure. The server may include multiple servers in communication with one another.

Figure 2:
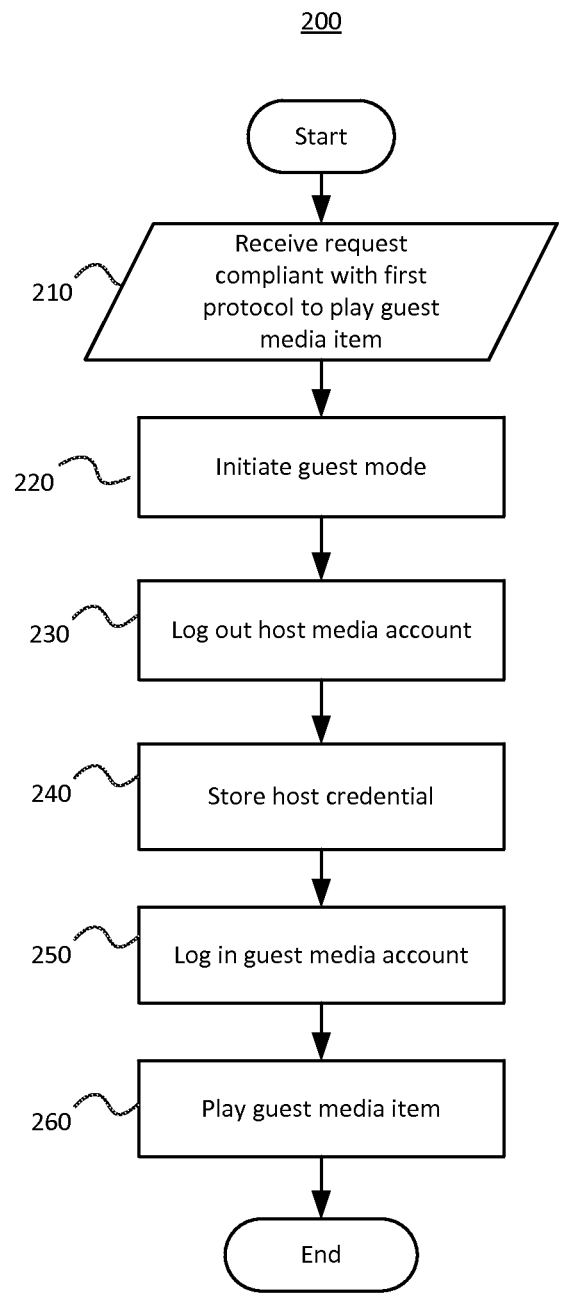
FIG. 2 shows a method according to an embodiment of the disclosed subject matter.

The subject matter of this disclosure may be implemented on the host media player, the guest device, and/or the server. For example, FIG. 2 shows a method 200 according to an embodiment of the disclosed subject matter as implemented on the host media player. At 210, the host media player receives a request compliant with a first protocol to play a guest media item from a guest media account. As mentioned above, the first protocol may be the DIAL protocol or any other protocol that is adopted by both the host media player and guest device and is suitable for discovering apps and launching apps on local networks. Other suitable protocols may include the multicast domain name system (mDNS) protocol and other "zero-configuration" protocols that require little or no user intervention or server configuration.

Based on receiving the play request in accordance with the first protocol, the host media player may initiate a guest mode at 220. The host media account may be logged in to the host media player, and the initiation of guest mode may trigger the host media player to log out the host media account at 230. Access to the host media account may be based on one or more authenticated host credentials, and once the host media account is logged out, the host media player may store the host credentials securely at 240. The host credentials may be encrypted and stored locally in the host media player or in a remote secure location. The host media player may receive one or more guest credentials, such as over the internet, and at 250 may log in the guest media account to the host media player based on the guest credentials. Once the guest media account has been logged in to the host media player, the method may play the guest media item at 260.

Figure 3:
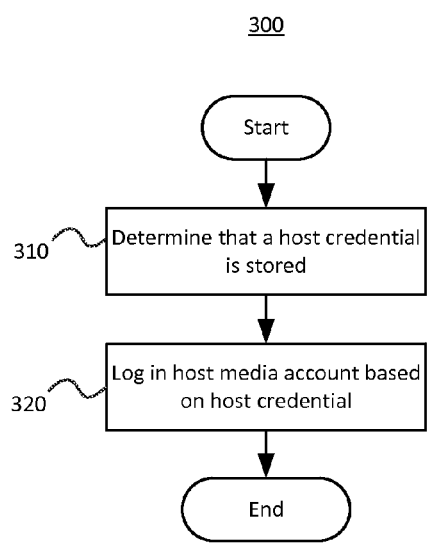
FIG. 3 shows a method according to an embodiment of the disclosed subject matter.

In some circumstances, the playback of the guest media item may be interrupted such as when an internet connection or power is lost. In such circumstances the guest may want to ensure there is no access to their media account once connectivity or power is restored. FIG. 3 shows a method 300 according to an embodiment of the disclosed subject matter, where the host media account may be logged in by default upon each startup of the host media player or upon startup of an application that enables access to guest or host media accounts. At 310 the host media player may determine whether a host credential is stored such as by querying the local storage of the host media player. At 320 the method may log in the host media account to the host media player. For example, the host media player may retrieve the host credentials and provide the host credentials for authentication on the host media player, or submit the host credentials to a remote server for authentication.

Figure 4:
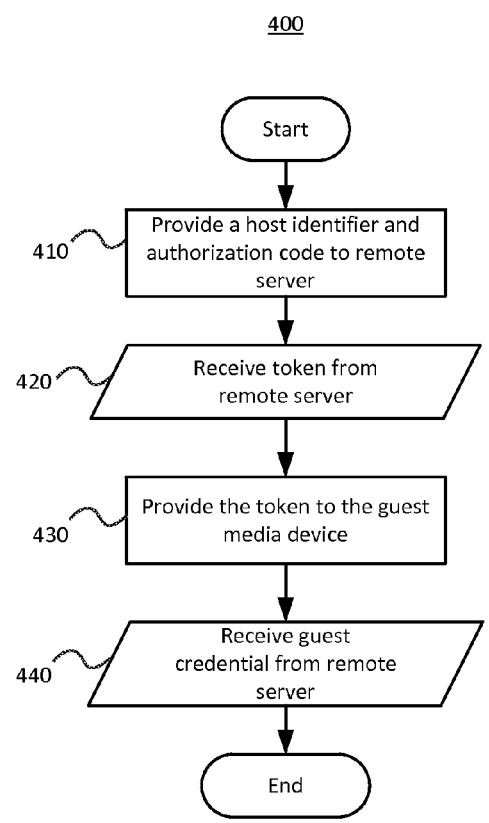
FIG. 4 shows a method according to an embodiment of the disclosed subject matter.

Various methods may be employed to cause guest credentials to be received in order to log in the guest media account to the host media player at 250. For example, FIG. 4 shows a method 400 according to an embodiment of the disclosed subject matter, for receiving guest credentials upon which to base the log in of the guest media account. At 410 the host media player may provide a host identifier to a remote server over the internet. In exchange for the identifier, the remote server may provide a token to the host media player at 420. At 430 the host media player may provide the token to the guest media device in order to facilitate the guest account log in.

In some implementations, an unmediated network connection may not exist between the guest device and the host media player. A variety of techniques may be employed to provide the token to the guest media device in order to facilitate guest account log in. For example, the token may be a sound file and the host media player may play the sound file as an audio signal. The guest device may capture the audio signal, such as through a microphone, and decode the signal into the token using conventional signal processing techniques. The token may be provided by other techniques such as via network broadcasting or multicasts over the WLAN. The token may also be provided as an emitted light signal such as infrared, as a Bluetooth transmission, or in accordance with any other technique suitable for the subject matter of this disclosure.

Once the guest media device has received the token it may provide the token to the remote server. Upon receipt of the token, the remote server may use the token to authenticate the guest media account. For example, the remote server may compare the received token to the token that was issued to the host media player. The remote server may also use identifying information or other authentication data provided by the guest device and known by the remote server in order to authenticate the guest media account. The remote server may then provide authenticated guest credentials to the host media player at 440, and the host media player may use the guest credentials to log in the guest account to the host media player.

Figure 5:
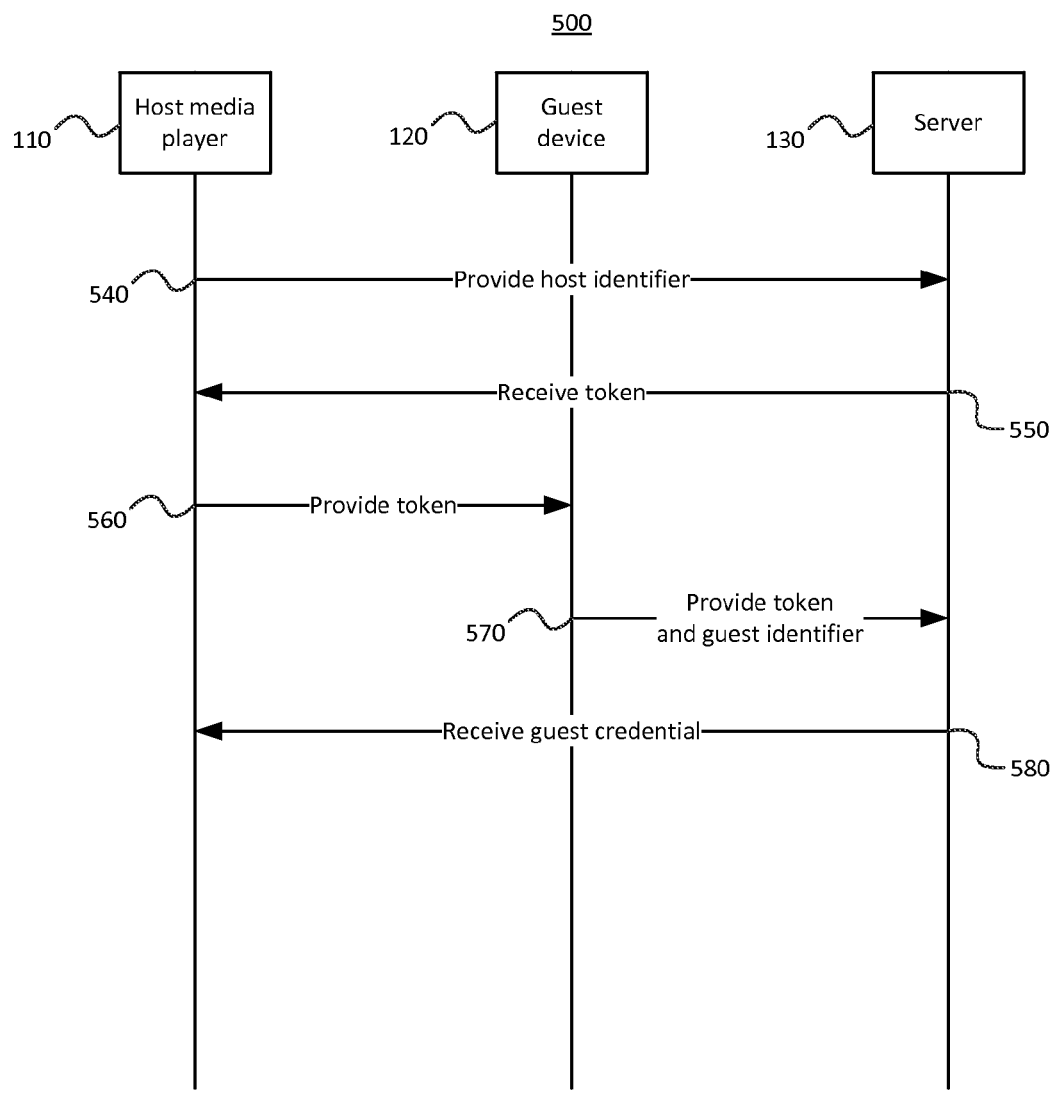
FIG. 5 shows sequence diagram according to an embodiment of the disclosed subject matter.

FIG. 5 shows sequence diagram 500, according to an embodiment of the disclosed subject matter, portraying method 400 across the host media player 110, guest device 120, and server 130. At 540, the host media player may provide a host identifier to the remote server. At 550 the host media player may receive a token in exchange for the host identifier. At 560 the host media player may provide the token to the guest device, and at 570 the guest device may then provide the token to the server. At 580, based on the receiving the same token from the guest device that had been initially issued to host media player, the remote server may provide guest credentials to the host media player. The guest may not be required provide additional authentication data because the guest device may already be logged in to the guest media account, which may be administered by the remote server. Thus after the guest device provides the token to the remote server, the remote server may provide the host media player a subset of the permissions already granted to the guest media account based on the guest's prior log in to the guest media account on the guest device. This subset of permissions may only allow read-only access to one or more media items from the guest media account.

In some implementations the guest device may control the guest media item on the host media player. In order to do so, an additional connection may be established between the host media player and guest device in order to support further functionality. For example although discovery and launch of the necessary applications and modes may be conducted in accordance with the first protocol, additional control of the guest media item may be supported by the establishment of a connection in accordance with a second protocol different from the first protocol.

Figure 6:
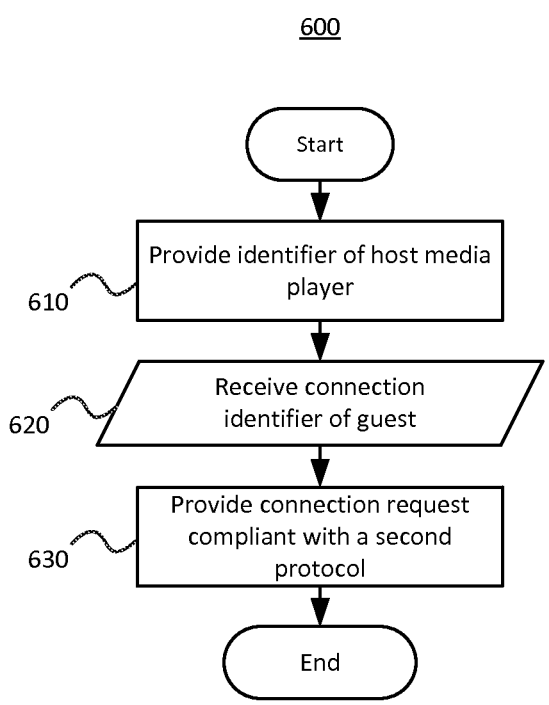
FIG. 6 shows a method according to an embodiment of the disclosed subject matter.

For example, FIG. 6 shows a method 600, according to an embodiment of the disclosed subject matter, that may establish a connection between the host media player and the guest device in accordance with a second protocol. At 610, the host media player may provide a host identifier of the host media player to the remote server. The remote server may provide the host identifier to the guest device, and in response, the guest device may provide the remote server with a connection identifier for the guest device. The remote server may then provide the connection identifier to the host media player at 620. In accordance with a second protocol that may be different than the first protocol, the host media player may provide a connection request to the guest device at 630. The guest device may then accept this connection request and a connection may be established between the host media player and the guest device, which supports additional functionality.

Figure 7:
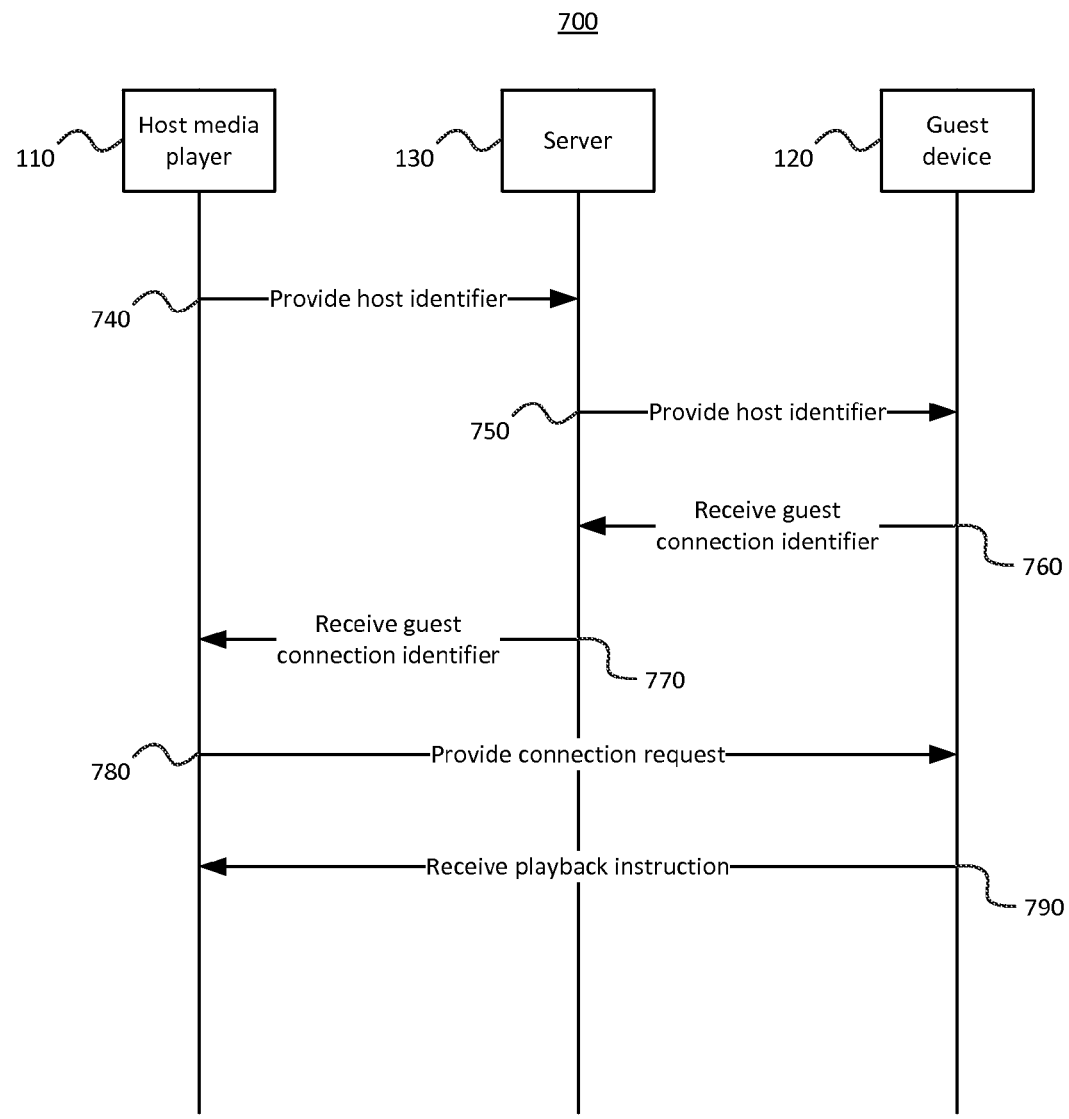
FIG. 7 shows a sequence diagram according to an embodiment of the disclosed subject matter.

FIG. 7 shows a sequence diagram, according to an embodiment of the disclosed subject matter, that portrays method 600 across the host media player 110, guest device 120, and remote server 130. This sequence may be executed in accordance with a second protocol such as the protocol known as the "WebSocket" protocol, "CASTV2" protocol, or a similar protocol that provides for full-duplex communication of messages over a transmission control protocol (TCP) connection. For example, at 740, the host media player may provide a host identifier to the remote server over the internet. The remote server may already know of the network location of the guest device due the fact that the guest device is logged in to the guest media account, and the media library associated with the guest media account is hosted by the remote server. Thus at 750, the remote server may provide the host identifier to the guest device. The guest device may then use the data included in the host identifier to verify that the host media player and guest device are connected to the same network, such as by matching an internet protocol (IP) address included in the host identifier to a network status of the network. At 760, in response to receiving the host identifier, the guest device may provide a connection identifier to the remote server, and at 770 the remote server may provide the connection identifier to the host media player. The connection identifier may, for example, include the IP address and port number on the guest device to which the host media player may connect in accordance with the second protocol. Based on the received connection identifier, the host media player may provide a connection request to the guest device at 780. Once the connection request is accepted, a connection such as a web-socket connection, may be established between the guest device and the host media player in accordance with the second protocol.

Figure 8:
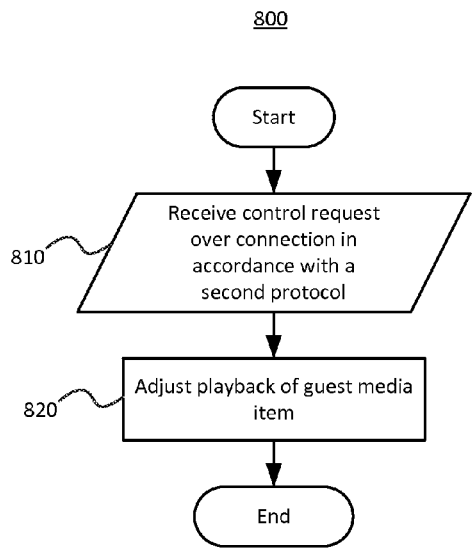
FIG. 8 shows a method according to an embodiment of the disclosed subject matter.

Once a connection is established in accordance with the second protocol, an indicator that the guest media item is being played on the host media player may be sent to the guest device. For example the guest media item itself may be displayed or audibly played on the guest device, a toggle button or a light indicator may be activated on an interface of the guest device, or an audio notice may be played on the guest device. At 790 the guest device may provide control requests, such as playback instructions, directly to the host media player. In an example according to an embodiment, FIG. 8 shows a method 800 where the host media player may receive a control request from the guest device at 810. For example, the guest device may issue volume adjustment commands, track forward or track backward commands, or commands selecting additional media items. At 820, the host media player may adjust playback of the media item based on a received control request. For example, based on receiving the track forward command, the host media player may advance playback a predetermined number of frames further into the guest media item's video playback sequence.

Figure 9:
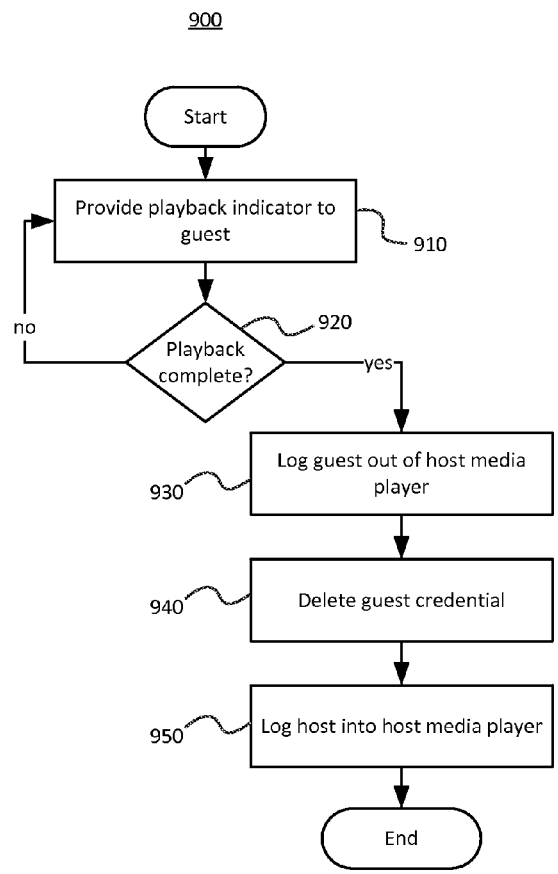
FIG. 9 shows a method according to an embodiment of the disclosed subject matter.

In some implementations a guest may want to ensure her guest account is logged out after completion of playback of the guest media item. Furthermore, the host may want to continue to have access to media items without needing to log in to the host media account again. FIG. 9 shows a method 900, according to an embodiment of the disclosed subject matter, for logging out the guest media account and logging in the host media account after playback is complete. For example, at 910 the host media player may provide a playback indicator to the guest device, such as a display of the media item being played on the host media player. At 920 the guest device may query whether playback of the media item is completed. If the media item is not completed, the method may return to step 910, such as for a predetermined period of time, before querying again. If the media item is completed, then at 930 the guest account may be logged out of the host media player. At 940 guest credentials may be deleted or overwritten by new credentials on the host media player, such as host credentials. At 950 the host media account may be logged in to the host media player. In this way, once the guest account is logged out, the host may still have access to media items from the host media account.

Figure 10:
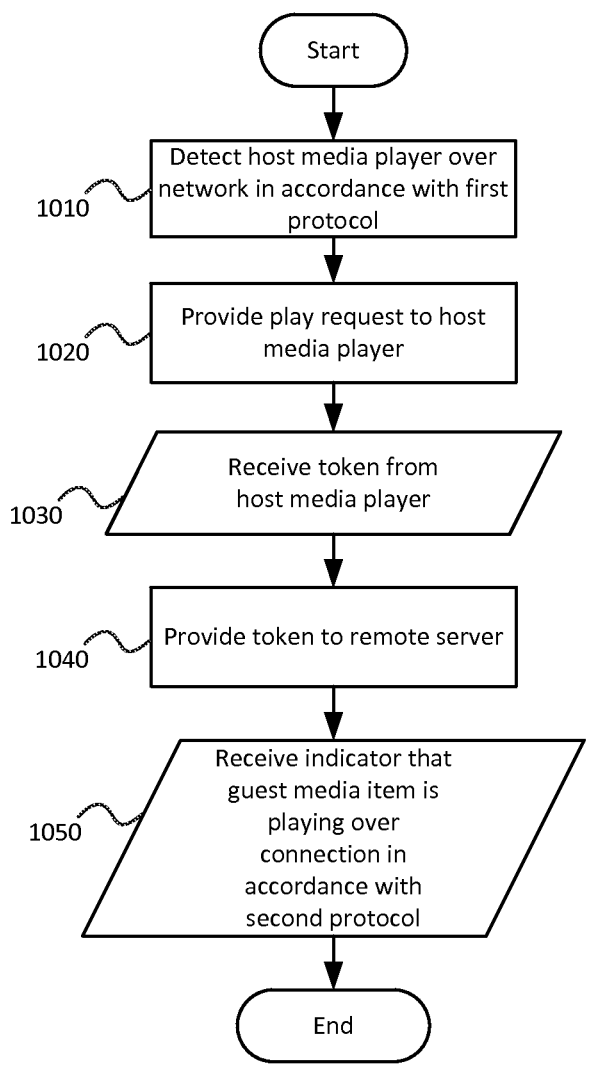
FIG. 10 shows a method according an embodiment of the disclosed subject matter.

As discussed above, the subject matter of this disclosure may be implemented on the host media player, guest device, and/or server. FIG. 10 shows a method 1000, according an embodiment of the disclosed subject matter, as implemented on the guest device. At 1010 the guest device may detect the host media player over a network in accordance with a first protocol, such as any of the examples of a first protocol discussed above. At 1020 the guest device may provide a play request to the host media player, which may imitate guest mode on the host media device. At 1030 the guest device may receive a token from the host media player, and at 1040 the guest device may provide that token to the remote server. Receiving and providing the token may occur in accordance with any of the techniques discussed in this disclosure. Once the guest media account is logged in to the host media player, the guest device may receive an indicator that the guest media item is playing on the host media player at 1050. The indicator may be received over a connection that is compliant with a second protocol different from the first protocol, such as any of the examples of a second protocol discussed elsewhere herein.

While the host media player is being discovered by the guest device in accordance with the first protocol, the guest device may also send a media item identifier to the remote server in order to identify the guest media item that the guest wishes to play. For example, FIG. 11 shows a method 1100, according to an embodiment of the disclosed subject matter, where the guest device may provide an identifier of the guest media item to the remote server at 1110. At 1120 the guest device may provide a play request to the host media player in accordance with the first protocol. The play request may also include an identifier of the guest media item. The host media player may also use the identifier of the guest media item to find and play the guest media item from the guest media account, once the guest media account is logged in to the host media player.

In some implementations, the guest device may receive the token provided by the host media player and decode the token. The guest device may decode the token in order to provide the token to the remote server in a format usable by the server. For example, FIG. 12 shows a method 1200, according to an embodiment of the disclosed subject matter, where the guest device may receive the token as an audio signal at 1210 and decode the token at 1220 in order to provide the token to the remote server. For example the audio signal may be decoded into a digital audio file by employing analog to digital conversion techniques. Other types of tokens and techniques disclosed herein may also be employed to perform such functionality.

As discussed previously, the subject matter of this disclosure may establish a connection between the host media player and guest device in accordance with a second protocol in order to provide functionality such as indicators and controls on the guest device regarding the guest media item. For example, FIG. 13 shows a method 1300, according to an embodiment of the disclosed subject matter, where a connection in accordance with the second protocol may be established. At 1310 the guest device may receive a host identifier of the host media player. At 1320 the guest device may verify that the host media player is connected to the same network as the guest device, such as by comparing a network status to IP data included in the host identifier. Upon receiving the host identifier, the guest device may provide a connection identifier to the host media player at 1330. This connection identifier may, for example, specify a port and IP address of the guest device. The connection identifier may be provided via the remote server or via other network connections. At 1340 the guest device may receive and accept a connection request from the host media player such as the connection requests discussed elsewhere in this disclosure with respect to the second protocol. At 1350, the guest device may provide an instruction related to playback of the guest media item over the connection established in accordance with the second protocol.

Figure 14:
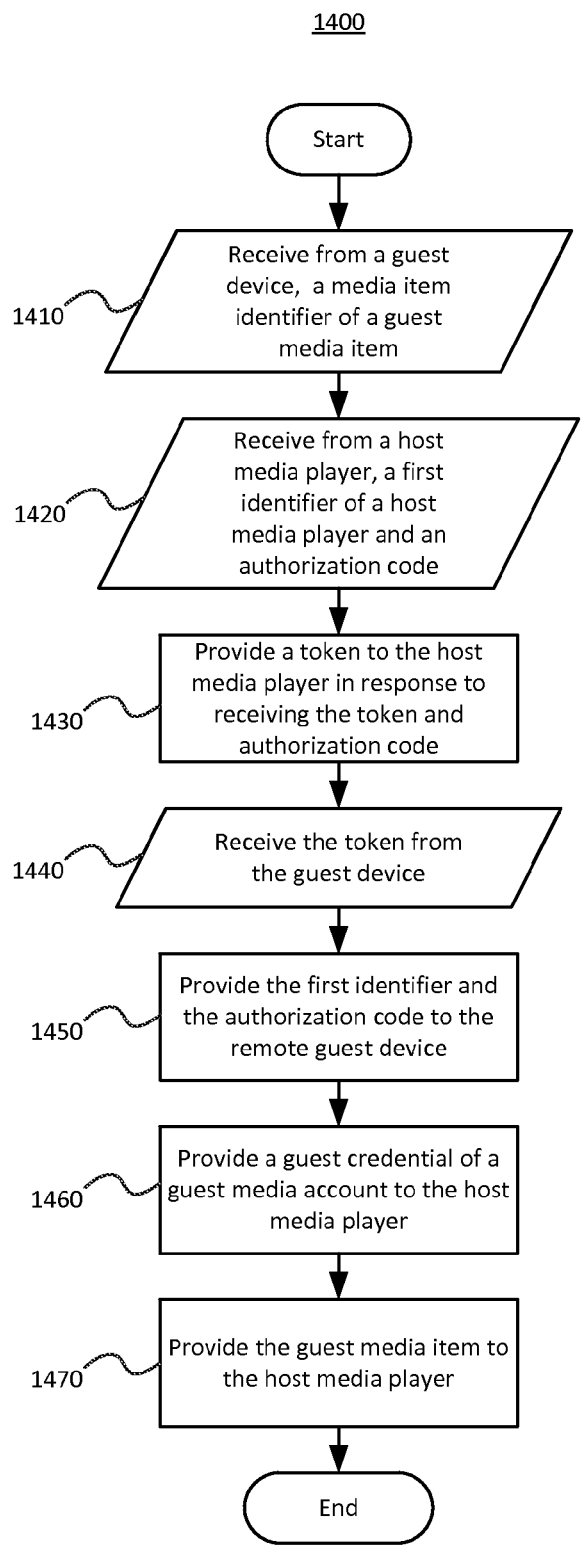
FIG. 14 shows a method according to an embodiment of the disclosed subject matter.

As discussed above, the subject matter of this disclosure may be implemented on the host media player, the guest device, and/or the server. FIG. 14 shows a method 1400 according an embodiment of the disclosed subject matter, as implemented on one or more servers. The host media player and guest device may each be located remotely from the server. At 1410 the server may receive from the guest device, a media item identifier of a guest media item. Based on this media item identifier, the server may identify a media item to be played from the guest media account. At 1420 the server may receive a first identifier of a host media player. In response to receiving the first identifier, the server may provide a token to the host media player at 1430. At 1440 the server may receive the token from the guest device, and based on the token, provide the first identifier to the guest device at 1450. The server may also authenticate the token and provide an authenticated guest credential to the host media player at 1460. After the guest media account is logged in to the host media player, the server may provide the guest media item to the host media player from the guest media account.

Various servers or subcomponents of servers may operate in conjunction to log in the guest media account to the host media player. For example, the host media player may provide an authorization code to a first server. The host media player and the first server may be in communication because the host may have a host media account that is maintained by the first server. The host media player may also provide the authorization code and a host identifier of the host media player to a second server. In response to receiving the authorization code and the host identifier, the second server may, such as at 1420, provide the host media player a token. The host media player may then provide the token to the guest device, such as at 1430, and the guest device may then provide the token to the second server, such as at 1440. In response to receiving the token, the second server may provide the authorization code to the guest device. The guest device may then provide the authorization code to the first server. In response to receiving the authorization code and based on comparing the code to the code previously received from the host media player, the first sever may provide authenticated guest credentials to the host media player. The host media player may then base the log in of the guest media account on the guest credentials. The functionality discussed in this paragraph may be implemented on a single server, such as where the first server and the second server are considered a single server, or across multiple servers.

Figure 15:
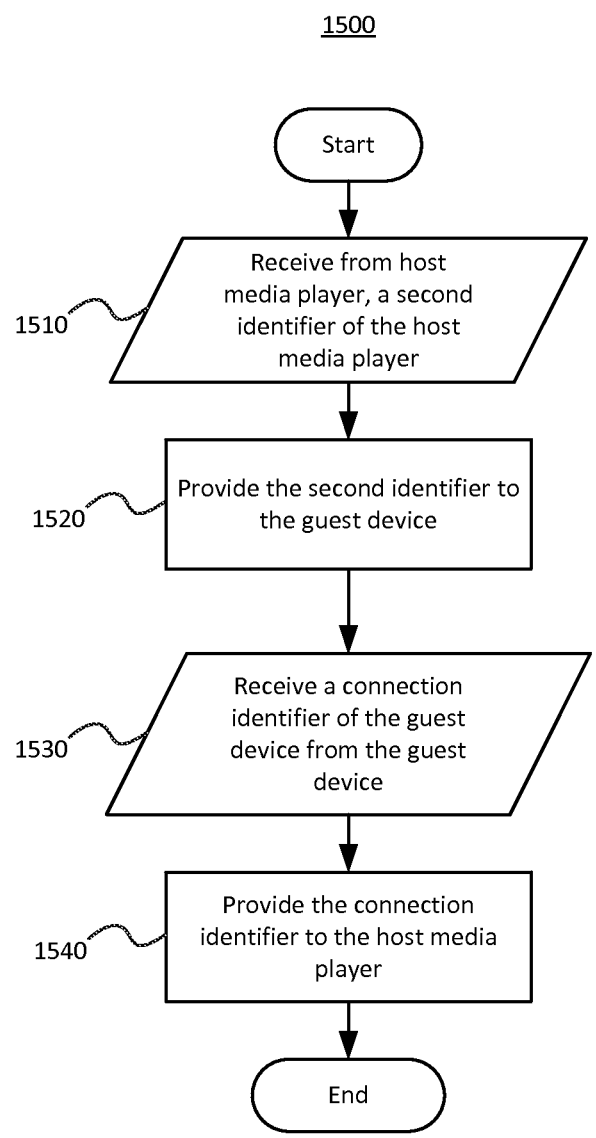
FIG. 15 shows a method according to an embodiment of the disclosed subject matter.

In addition to logging in the guest media account to the host media player, the server may facilitate a connection between the host media player and the guest device. For example FIG. 15 shows a method 1500, according to an embodiment of the disclosed subject matter, for facilitating such a connection. At 1510 the server may receive, from the host media player, a second identifier of the host media player. For example the server may receive the IP address of the host media player. In some implementations the host media player and the guest device may not have a direct connection. Thus at 1520, the server may provide the second identifier to the guest device, for example over the internet. At 1530 the guest device may provide to the server, a connection identifier such as that disclosed elsewhere in this disclosure. At 1540, the server may provide the connection identifier to the host media player. Upon receipt of the connection identifier, the host media player may send a connection request to the guest device that, once accepted, may allow a direct connection between the host media player and the guest device.

Similar to the above, various servers or subcomponents of servers may operate in conjunction to facilitate a connection between the host media player and the guest device. For example, in some implementations it may not be feasible to maintain a consistent connection between the host media player and the guest device. As a result, the host media player may repeatedly transmit host identifiers of the host media player to a first server, such as at 1510. The first server may forward transmit these host identifiers to a second server, which may then forward the host identifiers further to the guest device, such as at 1520. The guest device may then respond with the connection identifier to either the second server or the first server, such as at 1530. Either the first sever or the second server may then forward the connection identifier to the host media player, such as at 1540. In response to receiving the connection identifier, the host media player may provide a connection request directly to the guest device in accordance with the second protocol. Similarly to the above, the functionality discussed in this paragraph may be implemented on a single server, such as where the first server and the second server are considered a single server, or across multiple servers.

Figure 16:
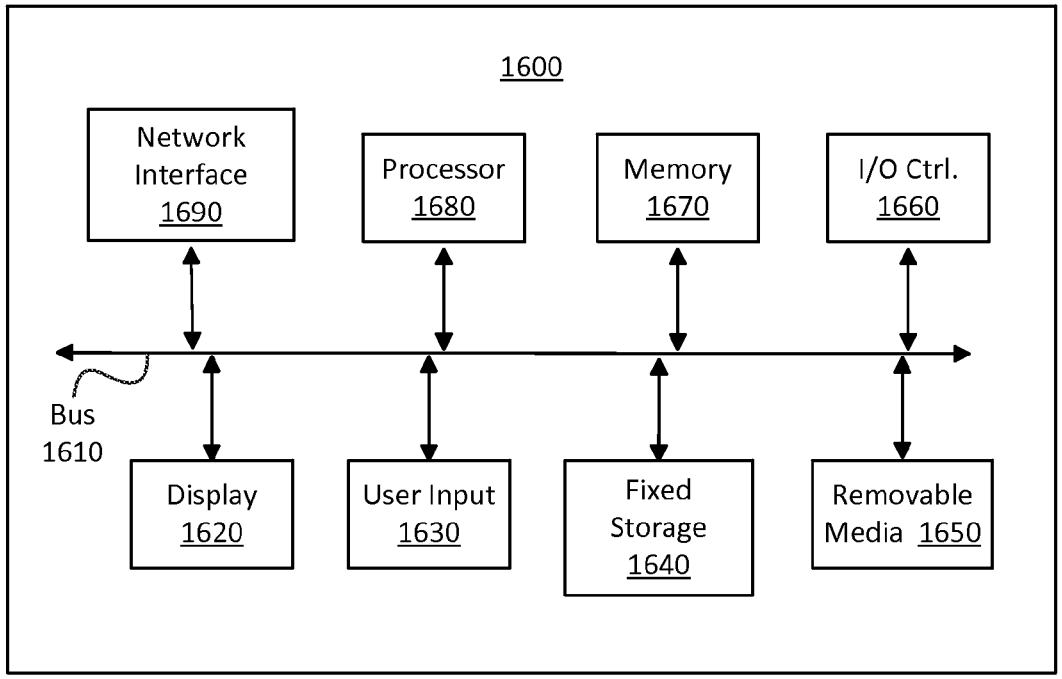
FIG. 16 shows a computing device according to an embodiment of the disclosed subject matter.

Implementations of the presently disclosed subject matter may be implemented in and used with a variety of component and network architectures. FIG. 16 is an example computing device 1600 suitable for implementations of the presently disclosed subject matter. The computing device may include a bus 1610 which interconnects major components of the computer 1600, such as a central processor 1680, a memory 1670 (typically RAM, but which may also include ROM, flash RAM, or the like), an input/output controller 1660, a user display 1620, such as a display screen via a display adapter, a user input interface 1630, which may include one or more controllers and associated user input devices such as a keyboard, mouse, and the like, and may be closely coupled to the I/O controller 1660, fixed storage 1640, such as a hard drive, flash storage, Fibre Channel network, SAN device, SCSI device, and the like, and a removable media component 1650 operative to control and receive an optical disk, flash drive, and the like.

The bus 1610 may allow data communication between the central processor 1680 and the memory 1670, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 1600 are generally stored on and accessed via a computer readable medium, such as a hard disk drive (e.g., fixed storage 1640), an optical drive, floppy disk, or other storage medium.

The fixed storage 1630 may be integral with the computing device 1600 or may be separate and accessed through other interfaces. A network interface 1690 may provide a direct connection to a remote server via a telephone link, to the Internet via an internet service provider (ISP), or a direct connection to a remote server via a direct network link to the Internet via a POP (point of presence) or other technique. The network interface 1690 may provide such connection using wireless techniques, including digital cellular telephone connection, Cellular Digital Packet Data (CDPD) connection, digital satellite data connection or the like. For example, the network interface 1690 may allow the computing device to communicate with other computers via one or more local, wide-area, or other networks, as shown in FIG. 17.

Many other devices or components (not shown) may be connected in a similar manner (e.g., document scanners, digital cameras and so on). Conversely, all of the components shown in FIG. 16 need not be present to practice the present disclosure. The components can be interconnected in different ways from that shown. The operation of a computer such as that shown in FIG. 16 is readily known in the art and is not discussed in detail in this application. Code to implement the present disclosure can be stored in computer-readable storage media such as one or more of the memory 1670, fixed storage 1640, removable media 1650, or on a remote storage location.

Figure 17:
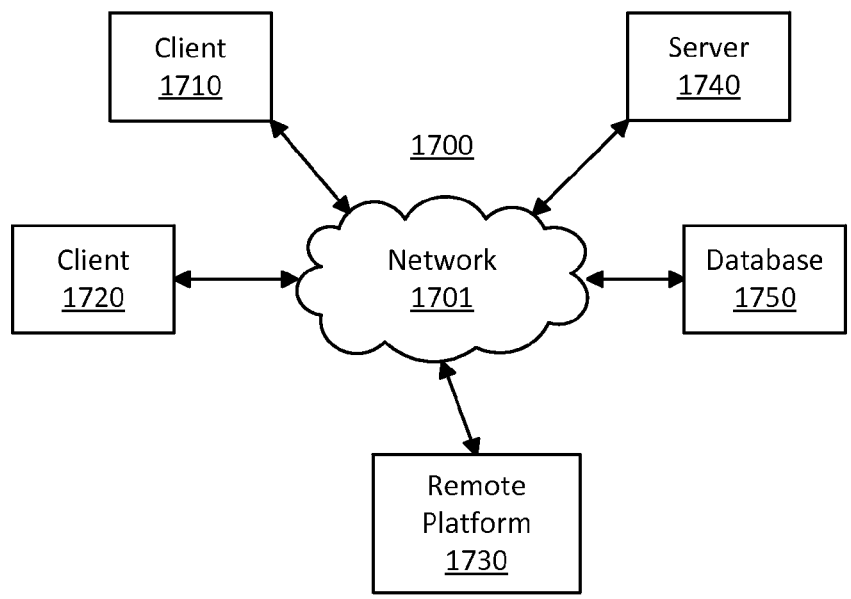
FIG. 17 shows a networked arrangement according to an embodiment of the disclosed subject matter.

FIG. 17 shows an example network arrangement 1700 according to an implementation of the disclosed subject matter. One or more clients 1710, 1720, such as local computers, smart phones, tablet computing devices, and the like may connect to other devices via one or more networks 1701. The network may be a local network, wide-area network, the Internet, or any other suitable communication network or networks, and may be implemented on any suitable platform including wired and/or wireless networks. The clients may communicate with one or more servers 1740 and/or databases 1750. The devices may be directly accessible by the clients 1710, 1720, or one or more other devices may provide intermediary access such as where a server 1740 provides access to resources stored in a database 1750. The clients 1710, 1720 also may access remote platforms 1730 or services provided by remote platforms 1730 such as cloud computing arrangements and services. The remote platform 1730 may include one or more servers 1740 and/or databases 1750.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   receiving, at a host media player that is logged into a host media account with host permissions, a play request from a guest device that is logged into a guest media account,
      the play request comprising a request to play a guest media item from the guest media account,
      the play request compliant with a first protocol;
   in response to receiving the play request compliant with the first protocol, initiating a guest mode on the host media player;
   logging out the host media account from the host media player;
   storing a host credential of the host media account;
   prior to logging in the guest media account to the host media player:
      providing to a remote server, an identifier of the host media player;
      receiving a token comprising an audio file from the remote server;
      playing the audio file; and
      receiving the guest credential of the guest media account from the remote server;
   logging in, based on a guest credential, the guest media account to the host media player with guest permissions comprising fewer permissions than the host permissions; and
   playing the guest media item from the guest media account.

2. The method of claim 1, further comprising, prior to receiving the play request:
   upon startup of the host media player, determining that the host credential is stored, and
   logging in the host media account to the host media player, based on the host credential.

3. The method of claim 1 wherein the guest mode allows only read-only access to a logged in media account while in guest mode.

4. The method of claim 1, further comprising, prior to playing the guest media item:
   providing an identifier of the host media player to the guest media device;
   receiving a connection identifier of the guest media player from the guest media device; and
   providing to the guest media device, a connection request based on the connection identifier,
      the connection request compliant with a second protocol different from the first protocol.

5. The method of claim 1, further comprising:
providing to the guest media device, an indicator that the guest media item is playing on the host media player;
logging out the guest media account from the host media player upon completion of the guest media item;
deleting the guest credential; and
logging in the host media account to the host media player based on the host credential.

6. The method of claim 1, wherein the host credential is stored securely in the host media device.

7. The method of claim 1, wherein the guest permissions comprise read-only access to the guest media account.

8. The method of claim 1, further comprising:
receiving, over a connection in accordance with a second protocol different from the first protocol, a control request from the guest device to adjust playback of the guest media item; and
adjusting playback of the guest media item based on the control request.

9. A method comprising:
detecting over a network in accordance with a first protocol and by a guest media device that is logged in to a guest media account, a host media player that is logged in to a host media account;
providing over the network to the host media player, a request to play a guest media item from the guest media account,
the request compliant with the first protocol;
receiving a token from the host media player, wherein receiving the token comprises receiving a sound wave;
prior to providing the token to a remote server, decoding the token;
providing the token to the remote server; and
receiving over a connection in accordance with a second protocol, an indicator that the guest media item is playing on the host media player,
wherein the second protocol is different than the first protocol.

10. The method of claim 9, further comprising, prior to providing over the network to the host media player, the request to play the guest media item from the guest media account:
providing to the remote server, an identifier of the guest media item.

11. The method of claim 9, further comprising, prior to receiving the indicator that the guest media item is playing on the host media player:
receiving from the host media player, a identifier of the host media player;
verifying the host media player is connected to the network based on the identifier;
providing to the host media player, a connection identifier of the guest media player; and
accepting a connection request from the host media player to establish a connection in accordance with a second protocol,
wherein the indicator that the guest media item is playing is received over the connection in accordance with the second protocol.

12. The method of claim 9, further comprising:
providing to the host media player over the connection, an instruction to adjust playback of the guest media item.

13. A host media player comprising at least one processor configured to:
while logged into a host media account with host permissions, receive a play request from a guest device that is logged into a guest media account,
the play request comprising a request to play a guest media item from the guest media account,
the play request compliant with a first protocol;
in response to receiving the play request compliant with the first protocol, initiate a guest mode on the host media player;
log out the host media account from the host media player;
store a host credential of the host media account;
prior to logging in the guest media account to the host media player:
provide to a remote server, an identifier of the host media player;
receive a token comprising an audio file from the remote server;
play the audio file; and
receive the guest credential of the guest media account from the remote server;
log in, based on a guest credential, the guest media account to the host media player with guest permissions comprising fewer permissions than the host permissions; and
play the guest media item from the guest media account.

14. The host media player of claim 13, wherein the at least one processor is further configured to, prior to receiving the play request:
upon startup of the host media player, determine that the host credential is stored, and
log in the host media account to the host media player, based on the host credential.

15. The host media player of claim 13, wherein the at least one processor is further configured to, prior to playing the guest media item:
provide an identifier of the host media player to the guest media device;
receive a connection identifier of the guest media player from the guest media device; and
provide to the guest media device, a connection request based on the connection identifier,
the connection request compliant with a second protocol different from the first protocol.

16. The host media player of claim 13, wherein the at least one processor is further configured to:
provide to the guest media device, an indicator that the guest media item is playing on the host media player;
log out the guest media account from the host media player upon completion of the guest media item;
delete the guest credential; and
log in the host media account to the host media player based on the host credential.

17. The host media player of claim 13, wherein the at least one processor is further configured to:
receive, over a connection in accordance with a second protocol different from the first protocol, a control request from the guest device to adjust playback of the guest media item; and
adjust playback of the guest media item based on the control request.

18. The host media player of claim 13, wherein the guest mode allows only read-only access to a logged in media account while in guest mode.

19. The host media player of claim 13, wherein the host credential is stored securely in the host media device.

20. The host media player of claim 13, wherein the guest permissions comprise read-only access to the guest media account.

* * * * *